US 6,697,213 B2

(12) United States Patent
Lofstrom et al.

(10) Patent No.: US 6,697,213 B2
(45) Date of Patent: Feb. 24, 2004

(54) COVER INCLUDING MULTIPLE COVER PLATES WITH DAMPED LAYERS

(75) Inventors: Paul D. Lofstrom, Roseville, MN (US); Stephen P. LeClair, Burnsville, MN (US); David D. Koester, Chanhassen, MN (US); Michael D. Schroeder, Webster, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 91 days.

(21) Appl. No.: 09/775,058

(22) Filed: Feb. 1, 2001

(65) Prior Publication Data

US 2001/0028525 A1 Oct. 11, 2001

Related U.S. Application Data

(60) Provisional application No. 60/193,672, filed on Mar. 31, 2000.

(51) Int. Cl.[7] .............................................. G11B 17/00
(52) U.S. Cl. ................................................... 360/97.01
(58) Field of Search ........................... 360/97.01–97.04; 188/73.37; 181/208

(56) References Cited

U.S. PATENT DOCUMENTS

| 3,940,553 | A | | 2/1976 | Hawkins ....................... 174/42 |
| 4,447,493 | A | | 5/1984 | Driscoll et al. ............. 428/332 |
| 4,778,028 | A | | 10/1988 | Staley ......................... 181/208 |
| 5,099,962 | A | * | 3/1992 | Furusu et al. ............. 188/73.37 |
| 5,214,549 | A | | 5/1993 | Baker et al. ............. 360/97.02 |
| 5,282,100 | A | | 1/1994 | Tacklind et al. .......... 360/97.02 |
| 5,422,767 | A | | 6/1995 | Hatchett et al. ......... 360/98.01 |
| 5,430,589 | A | | 7/1995 | Moir et al. ............... 360/97.02 |
| 5,473,122 | A | | 12/1995 | Kodiyalam et al. ......... 181/207 |
| 5,483,397 | A | | 1/1996 | Gifford et al. ........... 360/97.01 |
| 5,485,053 | A | | 1/1996 | Baz ............................ 310/326 |
| 5,517,375 | A | | 5/1996 | Dion ........................ 360/98.07 |
| 5,654,847 | A | * | 8/1997 | Yagi et al. ............... 360/97.02 |
| 5,666,239 | A | | 9/1997 | Pottebaum ............... 360/97.03 |
| 5,667,204 | A | | 9/1997 | Slocum ........................ 267/136 |
| 5,725,931 | A | | 3/1998 | Landin et al. ................ 428/134 |
| 5,757,580 | A | | 5/1998 | Andress et al. ............ 360/97.02 |
| 5,761,184 | A | | 6/1998 | Dauber et al. .............. 369/247 |
| 5,781,373 | A | | 7/1998 | Larson et al. ............. 360/97.02 |
| 5,838,092 | A | | 11/1998 | Wang et al. ................. 310/326 |
| 5,875,067 | A | | 2/1999 | Morris et al. ............ 360/97.01 |
| 5,949,033 | A | | 9/1999 | Anagnos ..................... 181/148 |
| 5,982,580 | A | * | 11/1999 | Woldemar et al. ....... 360/97.02 |
| RE36,806 | E | | 8/2000 | Landin et al. ............. 428/64.1 |
| 6,172,842 | B1 | * | 1/2001 | Satoh et al. ............. 360/97.01 |
| 6,229,668 | B1 | * | 5/2001 | Huynh et al. ............ 360/97.01 |
| 6,256,165 | B1 | | 7/2001 | Kim ........................ 360/97.01 |
| 6,266,207 | B1 | * | 7/2001 | Iwahara et al. .......... 360/97.02 |
| 6,279,679 | B1 | * | 8/2001 | Thomasen .................. 181/208 |
| 6,308,961 | B1 | * | 10/2001 | Kunikane et al. ........ 360/97.02 |

OTHER PUBLICATIONS

U.S. patent application Ser. No. 09/465,956, Janik et al., filed Dec. 1999.

* cited by examiner

*Primary Examiner*—Allen Cao
(74) *Attorney, Agent, or Firm*—Westman, Champlin & Kelly, P.A.

(57) ABSTRACT

A cover for a disc drive assembly including multiple damped cover plates. The multiple damped cover plates include a first cover plate and a second cover plate. Each of the first and second cover plates includes a damped structure, such as a viscoelastic damping layer, to damp vibration of the cover to reduce acoustic.

24 Claims, 9 Drawing Sheets

COVER INCLUDING MULTIPLE COVER PLATES WITH DAMPED LAYERS

CROSS-REFERENCE TO RELATED APPLICATION

The present application claims priority to Provisional Application Serial No 60/193,672 filed Mar. 31, 2000 and entitled "FOUR LAYER DAMPED COVER".

FIELD OF THE INVENTION

The present invention relates to a disc drive having rotating or reciprocating operating components. In particular, the present invention relates to a cover having multiple cover plates with damped layers for damping vibration for acoustic noise control for a disc drive.

BACKGROUND OF THE INVENTION

Disc drives provide data storage for digital information on discs. Discs are supported on a spindle hub which rotates about a spindle shaft to form a spindle assembly. An E-block assembly supports heads relative to discs to read data from and/or write data to the discs. The E-block assembly is rotationally supported relative to an E-block shaft to move heads for head placement relative to selected data tracks on surfaces of the discs. Rotation of the spindle hub and E-block about the spindle shaft and E-block shaft introduces vibration to the disc drive which produces acoustic noise.

With drive capacity increasing and form factor dimensions decreasing, disc drive embodiments have secured the spindle shaft and E-block shaft to covers secured to the base chassis of the disc drive. Thus, vibration introduced via rotation of the spindle hub and E-block is transmitted to the cover through the connections between the spindle shaft and E-block shaft and the cover. Vibration of the cover produces acoustic noise. The present invention addresses these and other problems and provides advantages and solutions not previously recognized.

SUMMARY OF THE INVENTION

The present invention relates to a cover for a disc drive assembly including a composite structure. The cover includes multiple cover plates including a first cover plate and a second cover plate. Each of the first and second cover plates includes at least one structural layer formed of a relatively rigid material and at least one damped layer to provide a cover with multiple damped cover plates.

DETAILED DESCRIPTION OF ILLUSTRATIVE EMBODIMENTS

Figure 1:
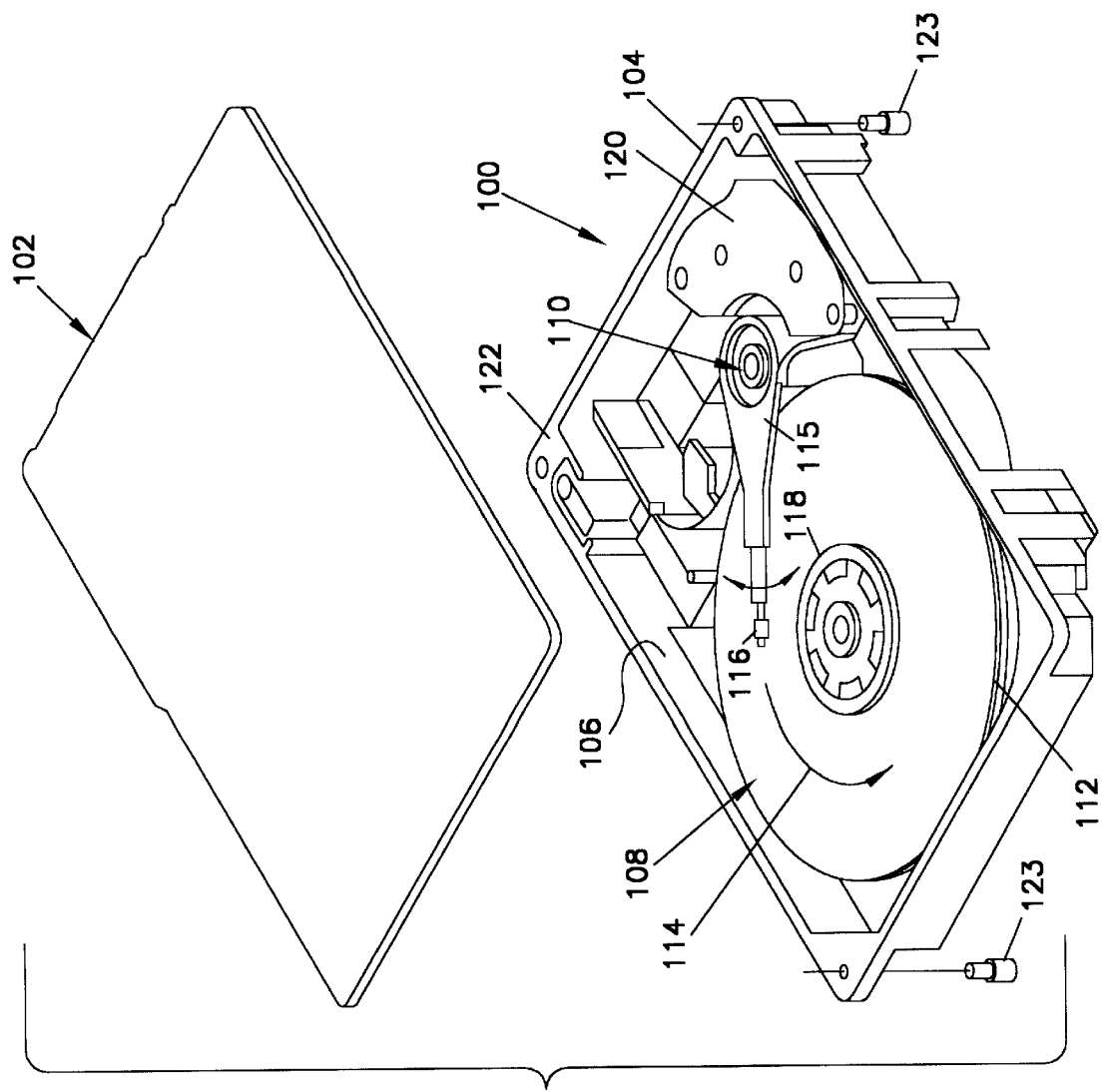
FIG. 1 is an illustration of an embodiment of a disc drive assembly with a cover exploded from a base chassis.

FIG. 1 illustrates a disc drive assembly 100 with a cover 102 exploded from a base chassis 104 to illustrate operating components of the disc drive assembly 100. As shown, the base chassis 104 includes a cavity 106 in which operating components including a spindle assembly 108 and an E-block assembly 110 are housed. Spindle assembly 108 includes a plurality of discs 112 rotationally supported for operation as illustrated by arrow 114. The E-block assembly 110 includes an E-block 115 which supports a plurality of heads 116 for movement along an operating path for placement of heads 116 related to selected data tracks on the discs 112, as illustrated by arrow 118. The E-block 115 is moved along the operating path 118 by operation of a voice coil motor (VCM) 120 to read data from or write data to the discs supported by the spindle assembly 108. Cover 102 is secured to a deck 122 of the base chassis 104 to close cavity 106 via fasteners 123.

Figure 2:
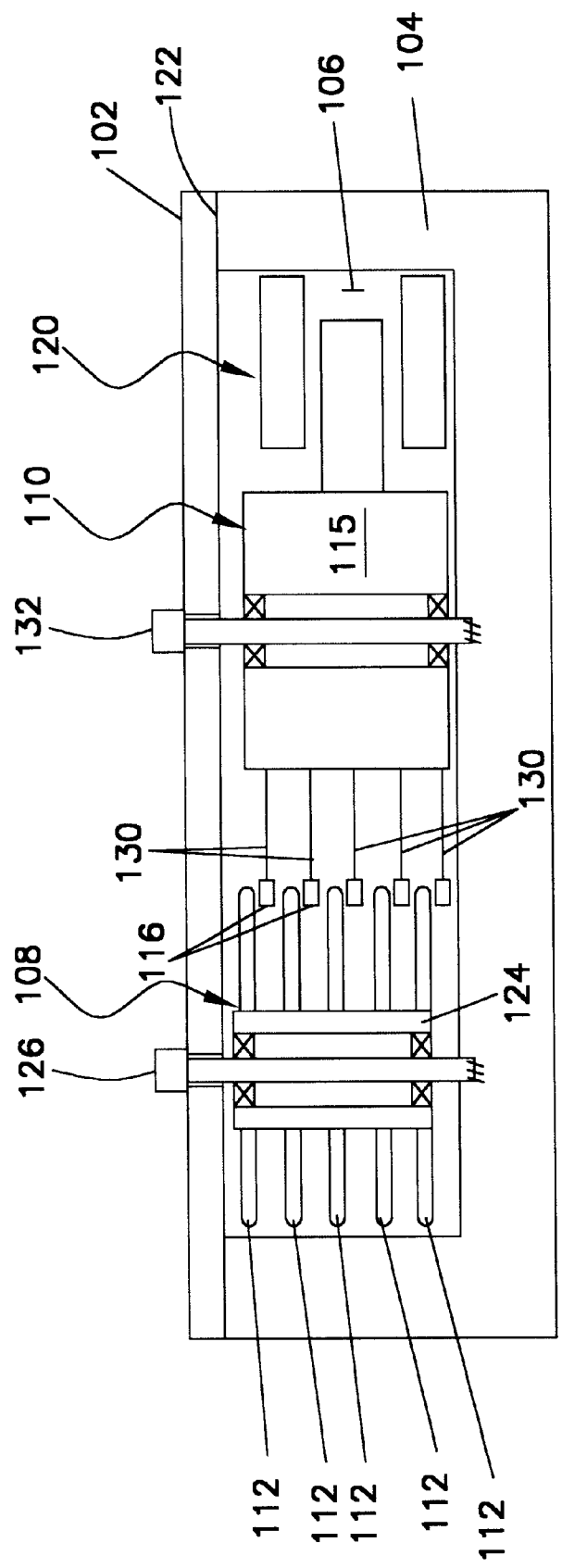
FIG. 2 is a schematic illustration of an embodiment of a spindle assembly supporting a plurality of discs and an E-block assembly secured to a cover connected to a base chassis of a disc drive assembly.

As shown schematically in FIG. 2, the spindle assembly 108 includes a rotating hub portion 124 and a spindle shaft 126 fixedly coupled to the base chassis 104 and cover 102. Hub portion 124 rotates about spindle shaft 126 via operation of a spindle motor (not shown). Discs 112 are supported on the spindle hub 124 for rotation for operation of the disc drive assembly E-block 115 includes a plurality of actuator arms 130 supporting the heads 116. E-block 115 rotates about an actuator shaft 132 similarly fixedly secured relative to the base chassis 104 and cover 102 as illustrated schematically. Rotation of the spindle hub 124 and E-block 115 imparts vibration to the cover 102 via the fixed connection between the shafts 126, 132 of the spindle assembly 108 and E-block assembly 110, respectively and the cover 102. Vibration of the cover 102 at different frequencies can create undesirable acoustic noise. The present invention relates to a cover with multiple damped cover plates to dampen vibration to reduce acoustic noise as will be described.

Figure 3:
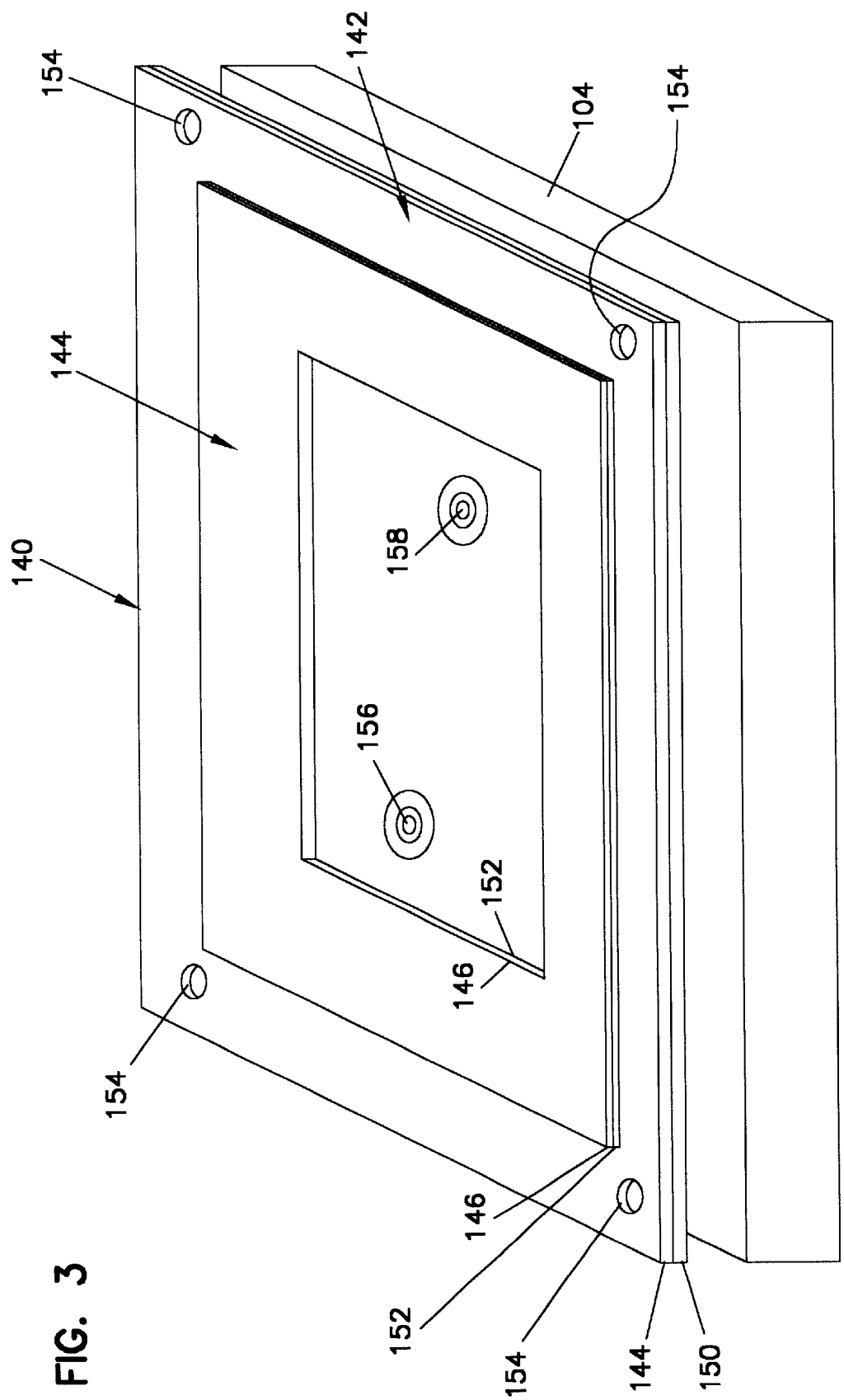
FIG. 3 is a schematic illustration of an embodiment of a cover having multiple damped cover plates of the present invention.

FIG. 3 schematically illustrates an embodiment of a cover 140 including multiple damped cover plates. In the embodiment shown, cover 140 includes a first cover plate 142 and second cover plate 144. Cover plates 142, 144 include a relatively rigid structural layer 144, 146, respectively, and a damped layer 150, 152, respectively, to damp vibration. In one embodiment the relatively rigid structural layers 144, 146 are formed of a stainless steel and the damped layers 150, 152 are formed of a viscoelastic material.

Cover plate 142 is a "fixed plate" and includes fastener openings 154 to secure cover plate 142 relative to base chassis 104 illustrated schematically in FIG. 3. Cover plate 142 also includes fastener bores 156, 158 aligned to secure shafts 126, 132 for the spindle assembly 108 and the E-block assembly 110 relative to cover 140. Thus, cover plate 142 is connected to the drive chassis 104 and operating components such that operating vibration is transmitted to cover plate 142. Damped layer 150 of cover plate 142 damps operating vibration transmitted to the cover plate 142 to reduce acoustic noise.

Cover plate 144 is coupled to cover plate 142 to form a "floating plate" on cover plate 142 which is not directly connected to the base chassis 104 or operating components of the disc drive. Thus, vibration of the first cover plate 142 connected to the base chassis 104 and spindle and E-block assemblies 108, 110 is imparted to the second cover plate 144. Damped layer 152 of the second cover plate 144 damps vibration imparted to the second cover plate 144 from the first cover plate 142 to provide multiple acoustic barriers to reduce acoustic noise. In the embodiment shown, cover plate 142 forms an inner cover plate and cover plate 144 form an outer cover plate which is layered on a portion of an outer surface of cover plate 142 although application of the present invention is not limited to the specific arrangement shown. As shown, cover plate 144 is contoured or shaped so that cover plate 144 does not cover or obscure fastener opening 154, 156, 158 for connecting cover plate 142 to the base chassis 104 and to the operating components of the disc drive assembly.

Figure 4:
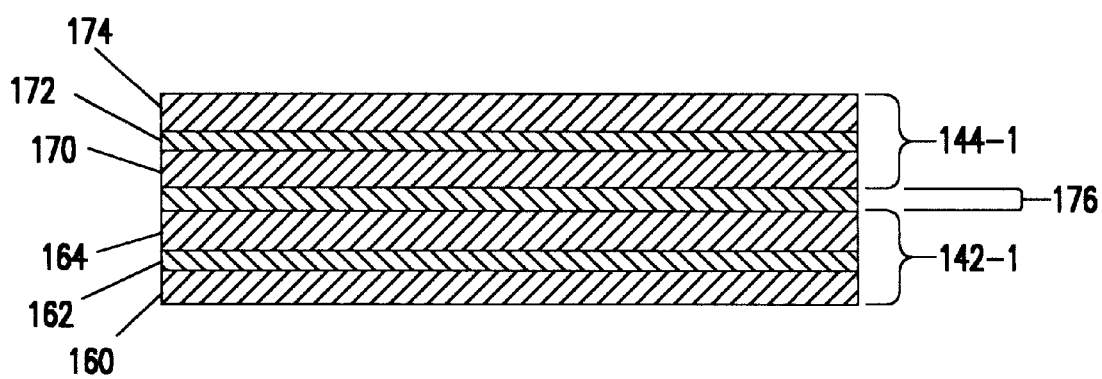
FIG. 4 illustrates an embodiment of a layered structure for multiple damped cover plates of the present invention.

FIG. 4 schematically illustrates an embodiment of multiple damped cover plates 142-1, 144-1, including multiple structural layers. In the embodiment shown in FIG. 4, the fixed cover plate 142-1 includes an inner layer 160, an intermediate damped layer 162 and an outer layer 164. Inner and outer layers 160, 164 are formed of a rigid structural material such as metal or stainless steel material. The intermediate damped layer 162 is formed of a viscoelastic material such as SCOTCHDAMP manufactured by 3M of St. Paul, Minn. Inner and outer layers 160, 164 are adhesively connected to the intermediate layer 162. In one embodiment, intermediate layer 162 includes a relatively thin adhesive layer on opposed surfaces of the intermediate layer 162 to adhesively secure inner and outer layers 160, 164 and the intermediate damped layer 162. Thus as described, force transmitted to cover plate 142-1 via the operating components is damped via the intermediate layer 162 to reduce noise.

As shown, "floating" cover plate 144-1 includes an inner layer 170, an intermediate layer 172 and an outer layer 174. Inner and outer layers are formed of a rigid structural material or metal and intermediate damped layer 172 is formed of a viscoelastic material similar to that described for plate 142-1. As previously described, layers can be adhesively connected to form a composite plate structure. In the embodiment described, an adhesive layer 176 connects cover plate 144-1 to cover plate 142-1 so that cover plate 144-1 forms an outer damped barrier to reduce acoustic noise of the disc drive assembly.

Figure 5:
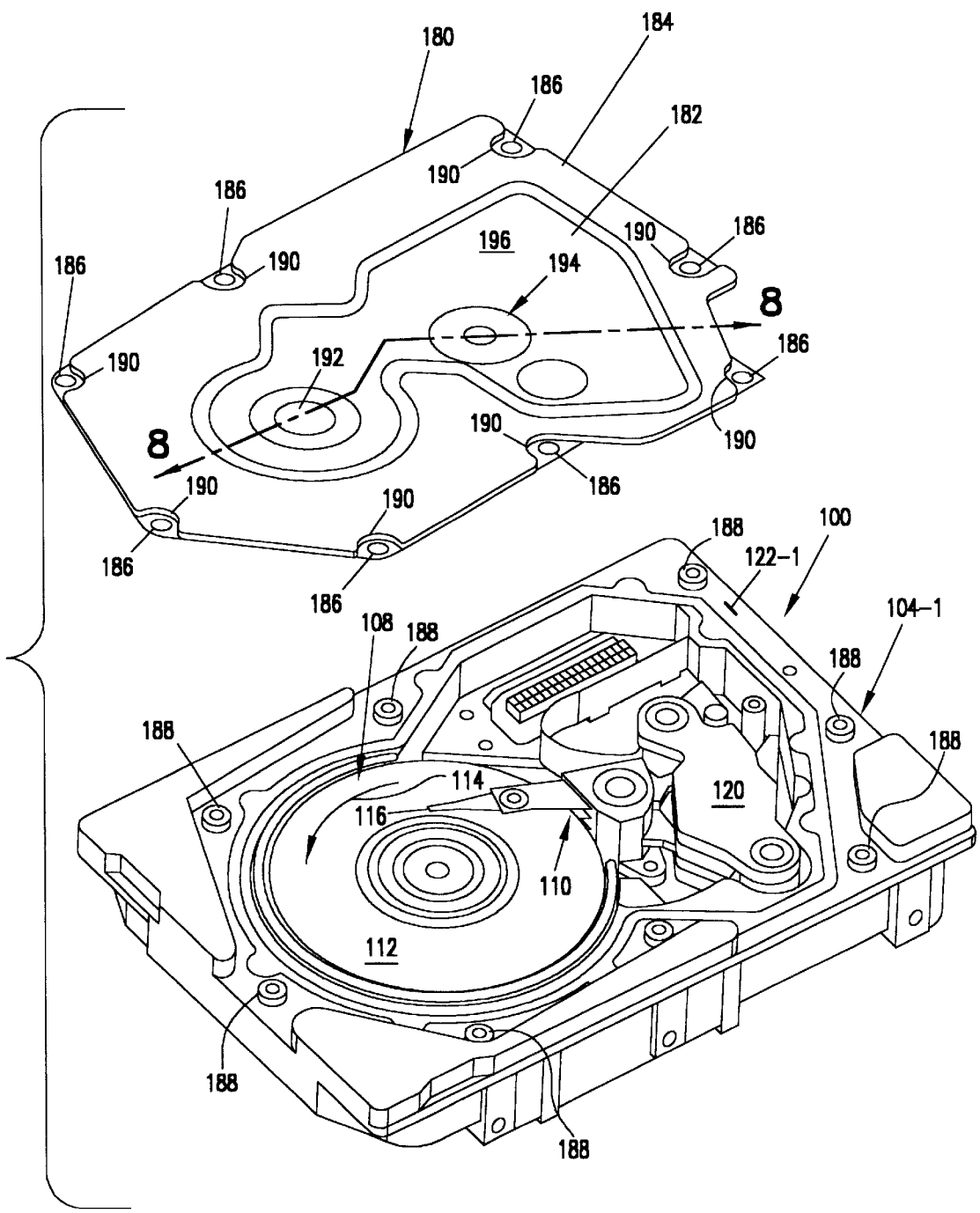
FIG. 5 is a perspective illustration of an embodiment of a disc drive assembly shown with a cover including multiple damped cover plates exploded from a base chassis of the disc drive assembly.
Figure 6:
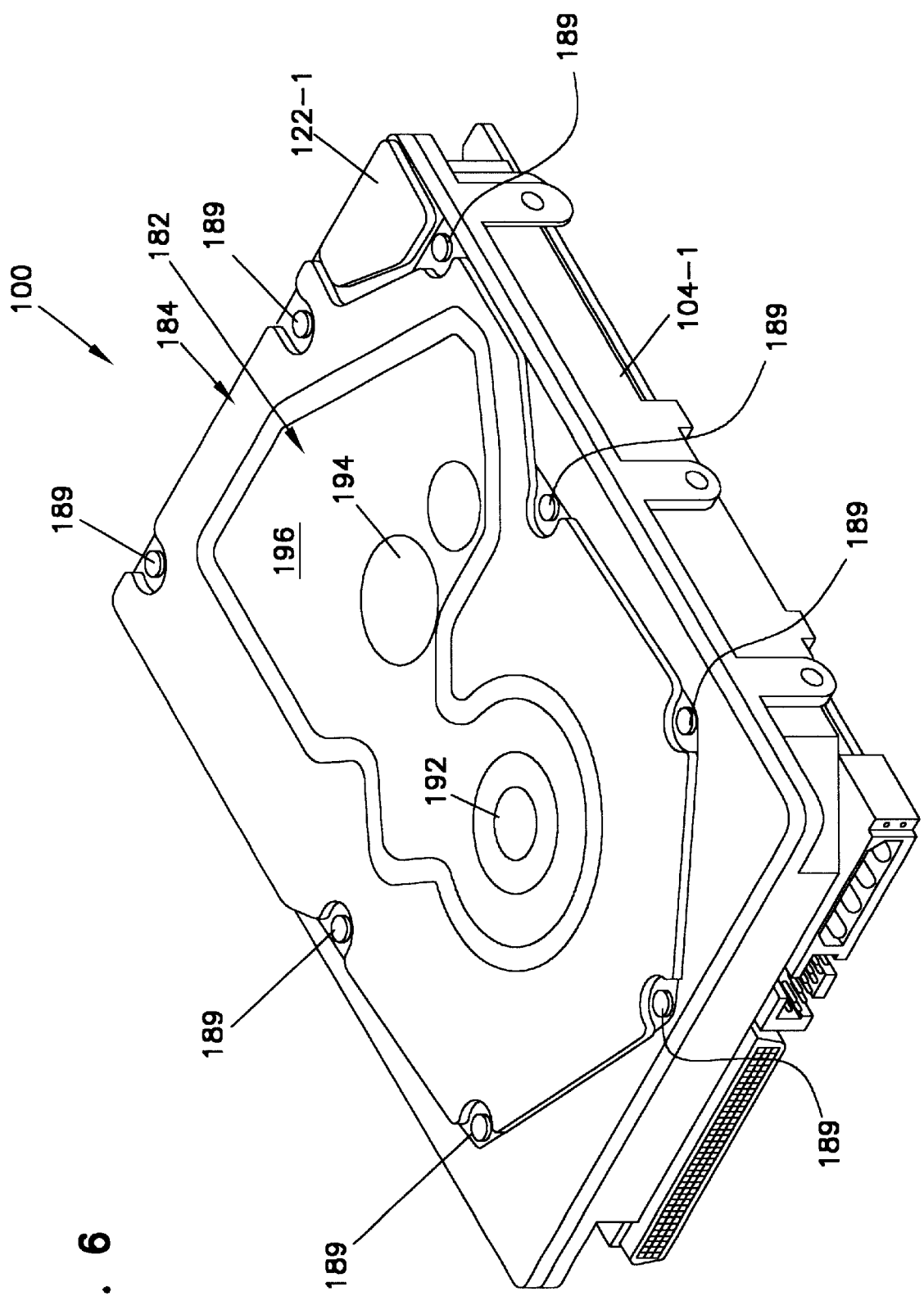
FIG. 6 is a perspective illustration of the disc drive assembly shown in FIG. 5 with the cover connected to the base chassis of the disc drive assembly.
Figure 7:
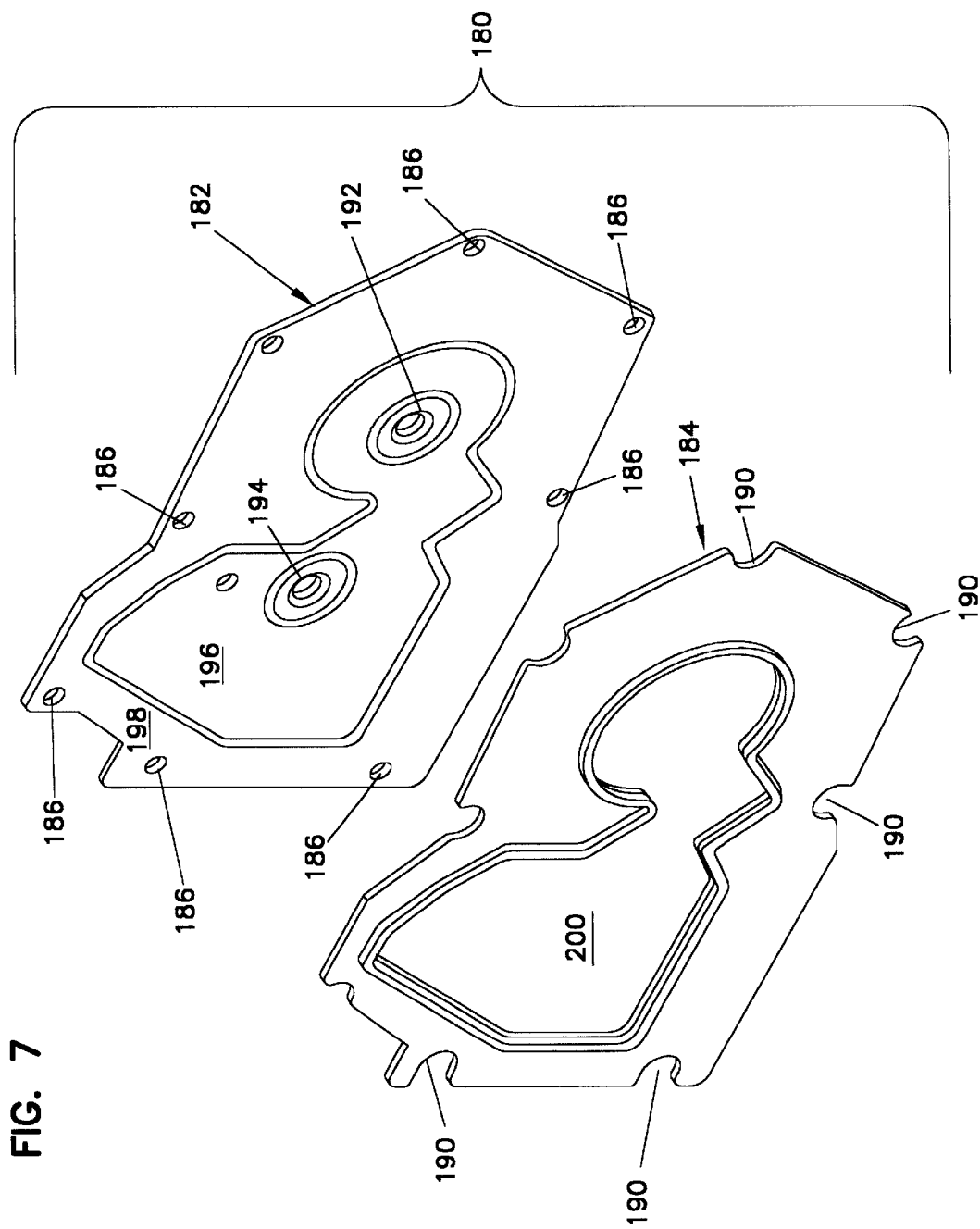
FIG. 7 is an exploded illustration of an embodiment of the cover including multiple damped cover plates as illustrated in FIG. 5.

FIGS. 5–7 illustrate an embodiment of a cover 180 including multiple damped cover plates for a disc drive assembly 100 where like numbers are used to refer to like parts in the previous FIGS. Cover 180 is shown exploded from base chassis 104-1 in FIG. 5 and is shown connected to deck 122-1 of base chassis 104-1 in FIG. 6. As shown, cover 180 includes multiple cover plates 182 and 184. Cover plate 182 is a fixed cover plate and includes fastener openings 186 to connect the cover plate 182 and cover 180 to deck 122-1 of base chassis 104-1. Fastener openings 186 on cover plate 182 align with fastener openings 188 on deck 122-1. Fasteners 189 shown in FIG. 6 extend through openings 186, 188 on cover plate 182 and deck 122-1 to connect cover 180 to deck 122-1 as shown in FIG. 6.

Cover plate 184 is connected to cover plate 182 to form the composite cover structure shown. As previously described, cover plate 182 is secured to deck 122-1 to form the fixed cover plate. Cover plate 184 is coupled to cover plate 182 and not base chassis 104-1 to form a "floating cover" plate. Cover plate 184 includes a plurality of notches 190 aligned with and contoured about fastener openings 186 to allow cover plate 182 to be connected to the base chassis 104-1 through fastener openings 186 without connecting cover plate 184 to the base chassis 104-1. In the embodiment shown, the composite cover 180 is coupled to deck 122-1 so that cover plate 182 forms an inner cover plate and cover plate 184 forms an outer cover plate supported over cover plate 182. Notches 190 provides access to the fastener openings 186 on cover plate 182 to insert fasteners 189 to connect cover 180 to the base chassis 104-1.

As shown in FIGS. 5–7, cover plate 182 includes fastener openings 192, 194 to secure spindle assembly 108 and E-block assembly 110 to the fixed cover plate 182. In the embodiment shown in FIGS. 7–8, fastener openings 192, 194 are formed on a raised portion 196 of plate 182 surrounded by rim portion 198 of cover plate 182. Cover plate 184 is supported on rim portion 198 of cover plate 182 and includes a cut-out portion 200. Raised portion 196 extends through cut-out portion 200. In the embodiment shown, cut-out portion 200 is contoured about raised portion 196 and provides accessibility to openings 192, 194 to fasten the spindle assembly 108 and E-block assembly 110 to fixed cover plate 182. Cover plate 184 is not connected to the spindle assembly 108 or E-block assembly 110 and provides a floating cover plate 184 not fixed or connected to the operating components of the disc drive assembly. Thus, vibration from the operating components connected to cover 180 is imparted to the floating cover plate 184 through the fixed cover plate 182.

Figure 8:
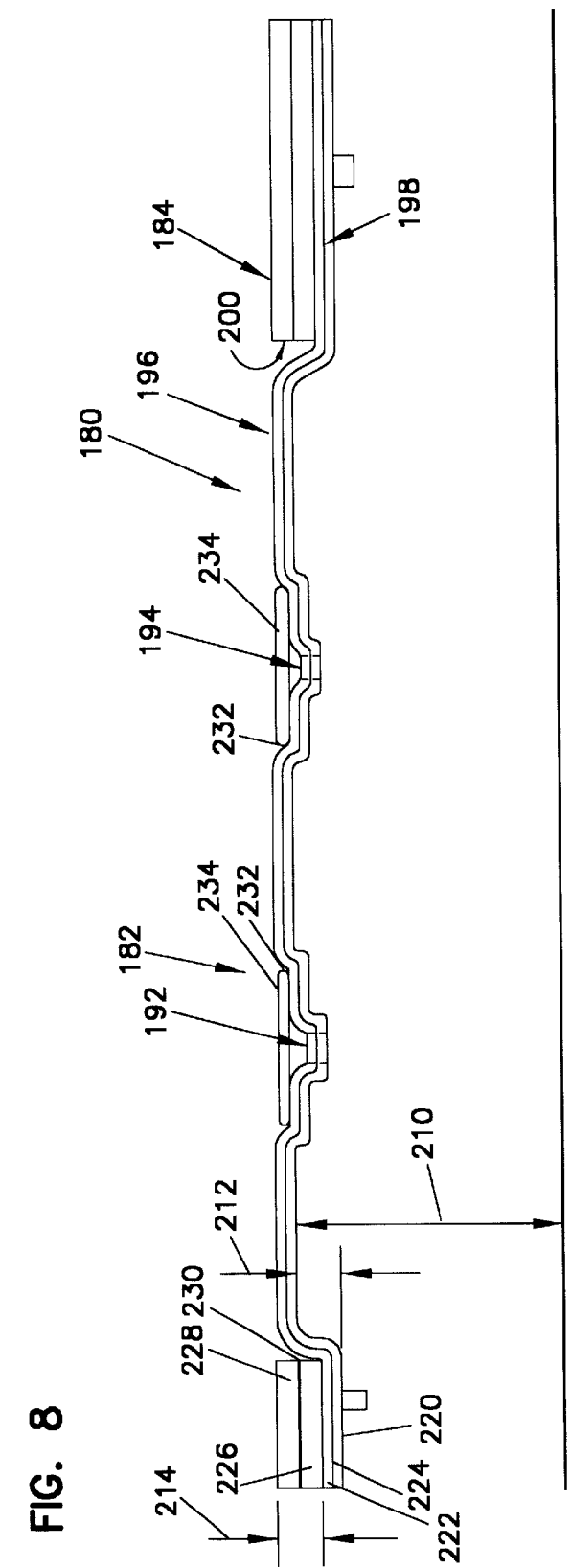
FIG. 8 is a cross-sectional view taken along line 8—8 of FIG. 5.

As shown in FIG. 8, a height of the raised portion 196 of cover plate 182 as illustrated schematically by line 210 provides sufficient height or clearance for the operating components (spindle assembly 108 and E-block assembly 110). As illustrated, a stepped elevation 212 of the rim portion 198 to the raised portion 196 is dimensioned similar to the thickness 214 of cover plate 184 so that an upper surface of cover plate 184 is flush with the raised surface of cover plate 182 to conform to desired form factor dimensions. Since cover plate 184 is supported on the rim portion 198, the raised portion 196 can be elevated a sufficient height to provide sufficient clearance for the operating components while the overall height of the composite structure does not increase the form factor dimensions of the cover 180.

In the embodiment illustrated in FIG. 8, cover plate 182 includes inner and outer 220, 222 structural layers and an intermediate damped layer 224. Cover plate 184 as shown includes inner and outer structural layers 226, 228 and an intermediate damped layer 230 to collectively provide an acoustic barrier to reduce acoustic noise. The structural layers and damped layers of cover plates 182, 184 are formed of relatively equal stiffness for optimum excitation response. Floating cover plate 184 is formed of a greater thickness than cover plate 182 to provide more concentrated mass for better inertia response.

As illustrated in FIG. 8, cover plate 182 fastener openings 192, 194 for the spindle assembly 108 and E-block assembly are formed in a stepped cavity 232. The cavity 232 is recessed from an upper surface of the cover plate 182 for insertion of a seal 234 to seal fastener openings 192, 194 and cavity 106 from an external operating environment. In one embodiment, seal 234 includes an adhesive backing to secure seal 234 to cover plate 182.

Figure 9:
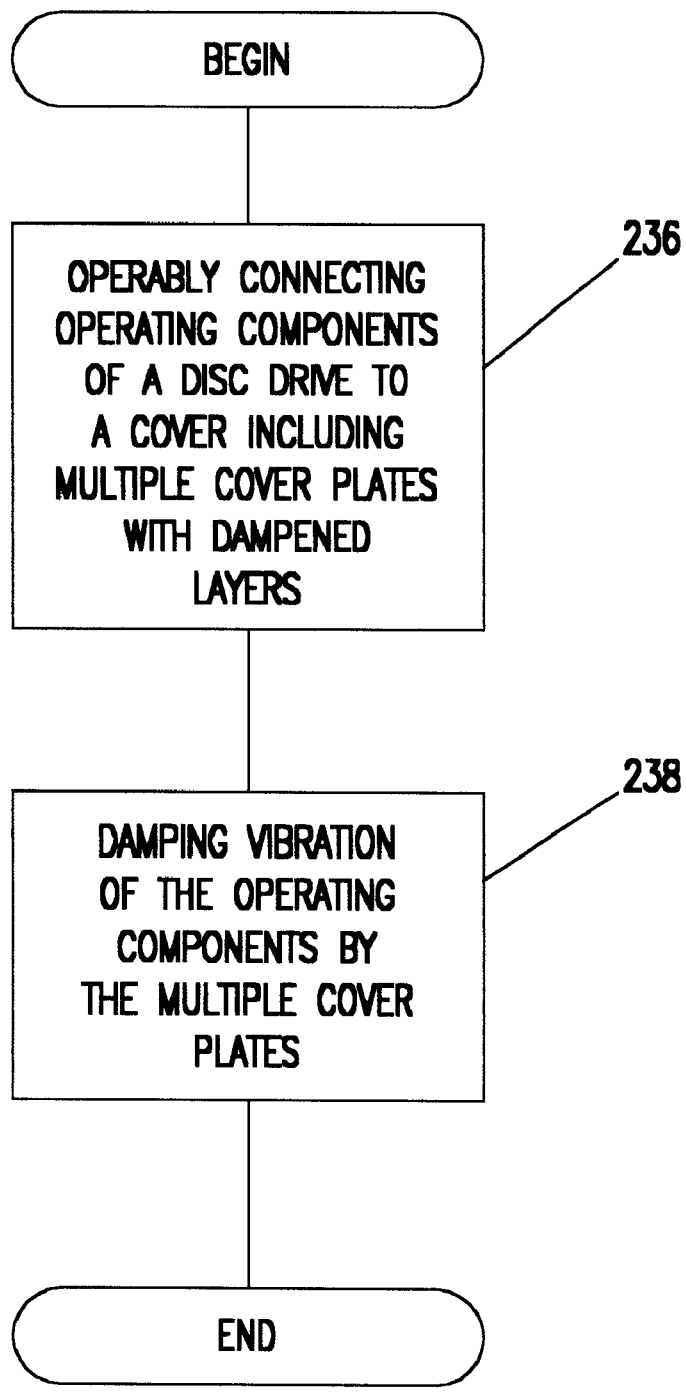
FIG. 9 is a flow chart illustrating an embodiment for damping vibration to reduce acoustic noise.

FIG. 9 is a flow chart illustrating an operation embodiment. As shown, dynamic operating components are coupled to a multiple cover plate cover as illustrated by block 236 and vibration is damped by damped layers of the multiple cover plates as illustrated by block 238.

The present invention relates to a cover 140, 180 with multiple damped cover plates 140, 144 or 182, 184. The multiple damped cover plates 140, 144, 182, 184 include at least one relatively rigid structural layer and a damped layer to dampen vibration for acoustic noise control.

Although a particular layer structure is described for the multiple damped cover plates of the present invention, application of the present invention is not limited to the specific structures disclosed. It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic disc drive system, it will be appreciated by those skilled in the art that the teachings of the present invention can be applied to other systems like an optical data storage system, without departing from the scope and spirit of the present invention.

What is claimed is:

1. A cover for a disc drive comprising:
    first and second cover plates each including at least one relatively rigid structural layer and the first cover plate including a fastener opening adapted to secure a spindle shaft of a spindle assembly relative to the first cover plate and a fastener opening adapted to secure an E-block shaft of an E-block assembly relative to the first cover plate;
    a first cover plate damped layer coupled to the at least one relatively rigid structural layer of the first cover plate; and
    a second cover plate damped layer coupled to the at least one relatively rigid structural layer of the second cover plate.

2. The cover of claim 1 wherein the first cover plate and the second cover plate are adhesively connected.

3. The cover of claim 1 wherein the at least one relatively rigid structural layers of the first and second cover plates are formed of a stainless steel material.

4. The cover of claim 1 wherein the damped layers are formed of a viscoelastic damped material.

5. The cover of claim 1 wherein the at least one relatively rigid structural layer of the first cover plate comprises:
    an inner layer formed of a relatively rigid material;
    an outer layer formed of a relatively rigid material; and
    the damped layer forming an intermediate layer between the inner and outer layers.

6. The cover of claim 1 wherein the at least one relatively rigid structural layer of the second cover plate comprises:
    an inner layer formed of a relatively rigid material;
    an outer layer formed of a relatively rigid material; and
    the damped layer forming an intermediate layer between the inner and outer layers.

7. The cover of claim 1 wherein the at least one relatively rigid structural layers of the first and second cover plates comprise:
    inner layers formed of a relatively rigid material;
    outer layers formed of a relatively rigid material; and
    the damped layers forming intermediate layers between the inner and outer layers.

8. The cover of claim 7 wherein the inner, outer and damped layers of the first and second cover plates are adhesively connected.

9. The cover of claim 1 wherein the second cover plate includes a cut-out contoured about the fastener openings on the first cover plate adapted to secure the spindle shaft and the E-block shaft to the cover.

10. A cover for a disc drive assembly comprising:
    first and second cover plates each including at least one relatively rigid structural layer;
    a first cover plate damped layer coupled to the at least one relatively rigid structural layer of the first cover plate;
    a second cover plate damped layer coupled to the at least one relatively rigid structural layer of the second cover plate;
    a plurality of fastener openings adapted to connect the first cover plate relative to a base chassis of the disc drive assembly; and
    a plurality notches on the second cover plate contoured about the fastener openings on the first cover plate adapted to connect the first cover plate to the base chassis of the disc drive assembly.

11. The cover of claim 1 wherein the first cover plate is connected to a base chassis of the disc drive to form an inner cover plate and the second cover plate is connected to the first cover plate to form an outer cover plate.

12. The cover of claim 11 wherein the first cover plate includes a rim portion and a raised portion elevated for clearance and the second cover plate is supported on the rim portion of the first cover plate and includes a cut-out portion to surround the raised portion to form a composite plate structure with the rim portion of the first cover plate.

13. The cover of claim 12 wherein the fastener openings adapted to secure the spindle shaft and the E-block shaft are on the raised portion and a dimension of a step between the rim portion and the raised portion is sized relative to a thickness of the second cover plate so that an upper surface of the second cover plate is flush with a stepped surface of the raised portion of the first cover plate.

14. A method for damping vibration of a disc drive assembly comprising steps of:
    connecting one of a disc spindle assembly or head actuator assembly of the disc drive assembly to a first cover plate having a first damped layer
    providing a second floating cover plate having a second damped layer coupled to the first cover plate; and
    damping vibration transmitted to the first cover plate by the first damped layer on the first cover plate and by the second damped layer on the second floating cover plate.

15. The method of claim 14 wherein vibration from operating components of the disc drive assembly is transmitted to the second cover plate through the first cover plate and the damped layer on the second cover plate damps vibration of the first cover plate.

16. A disc drive comprising:
    a base chassis;
    a spindle assembly rotationally supporting at least one disc;
    a head actuator assembly movably supporting a least one head to read data from or write data to the at least one disc;

a first cover portion including a first cover plate and a first damping layer coupled to the base chassis and having at least one of the spindle assembly or the head actuator assembly secured to the first cover portion; and a second floating cover portion coupled to the first cover portion and including a second cover plate and a second damping layer.

17. The disc drive of claim 16 wherein the first and second cover portions include opposed cover plate layers and the damping layers of the first and second cover portions are interposed between the opposed cover plate layers of the first and second cover portions.

18. The disc drive of claim 16 wherein the first cover portion forms an inner cover portion having an inner cover plate and inner damping layer and the second cover portion forms an outer cover portion having an outer cover plate and outer damping layer.

19. The disc drive of claim 18 wherein the inner cover portion includes a raised portion and the outer cover portion includes an opening aligned with the raised portion of the inner cover portion.

20. The disc drive of claim 18 wherein the outer cover portion includes a plurality of notches about openings in the inner cover portion to secure the inner cover portion to the base chassis.

21. A cover for a disc drive comprising;

a first cover portion having a first cover plate and a first damping layer and the first cover portion including a raised portion elevated above a rim portion; and a second cover portion having a second cover plate and second damping layer and the second cover portion including an opening for the raised portion of the first cover portion.

22. The cover of claim 21 wherein the first cover portion includes multiple fastener openings to secure the first cover portion to a base chassis.

23. The cover of claim 21 wherein the first cover portion forms an inner cover portion and the second cover portion forms an outer cover portion.

24. The cover of claim 21 wherein the first cover portion includes at least one fastener opening to secure at least one of a disc spindle assembly or a head actuator assembly to the first cover portion.

* * * * *